Oct. 14, 1958  R. ADELL  2,856,228
TRIM MOLDING FOR VEHICLE HOOD
Filed Dec. 26, 1952

INVENTOR.
ROBERT ADELL
BY
Gregory S. Dalgurnian
ATTORNEY.

United States Patent Office 2,856,228
Patented Oct. 14, 1958

2,856,228

TRIM MOLDING FOR VEHICLE HOOD

Robert Adell, Detroit, Mich., assignor to Franklin Z. Adell and Marvin M. Adell, Detroit, Mich.

Application December 26, 1952, Serial No. 328,065

1 Claim. (Cl. 296—44)

This invention relates to motor vehicles, and more particularly to an improved body therefor. The present application is a continuation-in-part of my co-pending application Serial No. 280,297, filed on April 3, 1952, for Trim Molding, now abandoned.

An automobile body, by its nature and construction, must include a number of swinging closures to permit access into and an exit from the interior of the body, as well as access to certain compartments thereof and particularly the rear compartment used for carrying luggage, tools, spare tire, etc., and an engine compartment. These swinging closures include the vehicle doors, usually two or four in number, a rear compartment lid and an engine hood.

Provision of said swinging closures results in a number of very difficult problems in this particular art, for some of which an adequate solution has not yet been found in spite of numerous attempts and a great variety of expedients proposed.

One of the objects of the present invention is to provide an improved automobile body in which the above difficulties are overcome and largely eliminated, whereby a greatly superior automobile body is provided with very little, if any, net increase in the cost thereof.

Another object of the present invention is to provide an automobile body in which the gaps along the edges of a swinging engine hood, are closed and a uniform fit of the closure along the edges of the body recess receiving such closure is easily effected.

A further object of the present invention is to provide an improved automobile body in which uneven gaps along the edges of the closure in the closed position thereof, occurring because of various manufacturing imperfections in the parts involved, or fautls in workmanship in installing the closure in its recess, may be easily corrected.

A still further object of the present invention is to provide an automobile body, which affords novel means and opportunitties for ornamenting the body and imparting to it a very striking and pleasing ornamental appearance.

Further objects and advantages of this invention will be apparent from the following description and appended claim, reference being had to the accompanying drawings forming a part of this specification, wherein like reference characters designate corresponding parts in the several views.

Figure 2:
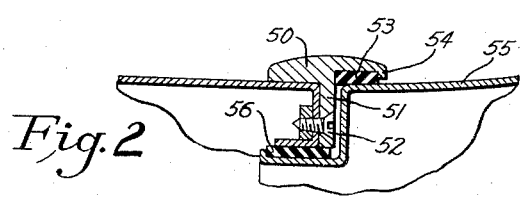
Fig. 2 is a fragmentary sectional view taken in the direction of the arrows on the section plane passing through line 2—2 of Fig. 1.

It is to be understood that the invention is not limited in its application to the details of construction and arrangement of parts illustrated in the accompanying drawings, since the invention is capable of other embodiments and of being practiced or carried out in various ways.

Also it is to be understood that the phraseology and terminology employed herein is for the purpose of description and not of limitation.

In accordance with the invention I provide means whereby the outer or swinging edges of the closure of an automobile body may be extended within predetermined limits beyond the contour of the closure, thereby closing or equalizing the gap that may be present between the outer edges of the closure in the closed position thereof at the body. In the embodiment illustrated, said means are exemplified by edge molding adapted to be installed on the closure along the edges thereof. Said molding, in addition to the above mentioned function, also serves as protective molding preventing nicking, rusting and other damage to the edges of the closure. In addition, the molding, which may be made of plated and polished metal, is highly ornamental and provides novel means for improving appearance of an automobile body and imparting to it a much more pleasing appearance than a conventional automobile body now has. The molding may be of the edge-covering type. The molding may have a T-shaped cross section or other similar cross section, and thus be made particularly advantageous in cases where the difference in the width of the gap is particularly large, such as in cases of engine hoods.

In the drawings there is shown, by way of example, an automobile body having an engine hood, and embodying the present invention.

Installation of the edge molding may be done in manufacturing of the body or it may be done on an automobile which is already on the road and perhaps had been on the road for a number of years. In other words, my improved means may be incorporated into a body as a part thereof or be distributed to the trade as an accessory for a spare part for installation in the field.

Figure 1:
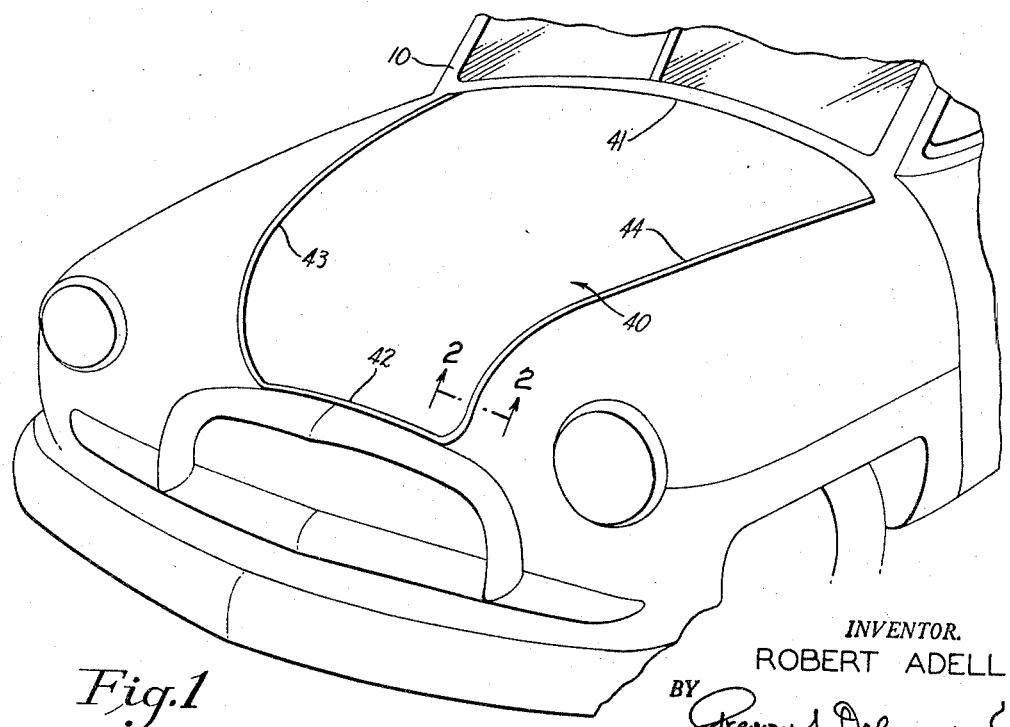
Fig. 1 is a perspective view of the front of an automobile having an engine hood and embodying the present invention.

Fig. 1 illustrates the front of the automobile body 10 forming an engine compartment adapted to be closed with the aid of a swinging engine hood generally designated by the numeral 40. The hood 40 has a rear edge 41, a front edge 42 and side edges 43 and 44, which edges in the closed position of the hood are meeting with the edges of the recess formed in the body to receive the hood. The hood 40 is hinged at its rear end in a manner well known in the art.

The edge molding, preferably having a T-shaped cross-section, is provided along the edges 43, 42 and 44 of the engine hood to close the gaps between said edges of the body, which gaps are usually uneven, and to provide ornamentation and protection for the edges. Referring to Fig. 2, the edge molding referred to above comprises an upper bar 50 and a leg 51 with the aid of which the molding is connected in any suitable manner such as with the aid of bolts 52 to the edge of the closure, in the present instance of the hood 40. A sealing strip 53 is carried by the upper bar of the molding, and it extends out of the groove housing it in a manner to be compressed and to prevent the lip 54 from coming into direct metal-to-metal contact on the body edge 55. A conventional resilient strip 56 (or a plurality of resilient pads) intended to prevent rattling of the engine hood when the same is closed, may be retained if desired. It will be understood, however, that the strip 54 alone may be sufficient to seal the engine hood and to prevent rattling thereof.

It will be understood that while plated sheet metal edge molding is preferred, such molding may also have the same color as the closure itself and be made of sheet materials other than metal such, for instance, as plastic. It will also be understood that the edge molding may be omitted along certain portions of the closure edge.

There is thus provided an improved automobile body and a protective and ornamental edge molding for the swinging closures thereof, whereby the objects of the present invention listed above and numerous additional objects are attained.

I claim:

In a motor vehicle having an engine compartment, a swinging hood for said compartment, said hood having front, side and rear edges; and a separable ornamental molding secured to the edges of said hood in a manner to close the gap between the hood and the edges of the body adjacent thereto, said moulding having a T-shaped cross section, the vertical leg of the T being secured to the hood and the horizontal bar of the T adapted in the closed position of the hood to overlap the edges of the hood and of the body edges adjacent thereto, and nonmetallic sealing means associated with said moulding.

References Cited in the file of this patent

UNITED STATES PATENTS

| | | |
|---|---|---|
| D. 172,414 | Adell | June 15, 1954 |
| 1,008,805 | England | Nov. 14, 1911 |
| 1,128,105 | Cheston | Feb. 9, 1915 |
| 1,240,646 | Bakewell | Sept. 18, 1917 |
| 1,800,060 | Farrington | Apr. 7, 1931 |
| 2,125,761 | Westrope | Aug. 2, 1938 |
| 2,197,648 | Mersheimer | Apr. 16, 1940 |
| 2,226,615 | Killen | Dec. 31, 1940 |
| 2,356,976 | Conlon | Aug. 29, 1944 |
| 2,383,575 | Wernig | Aug. 28, 1945 |

FOREIGN PATENTS

| | | |
|---|---|---|
| 811,432 | Germany | Aug. 20, 1951 |